United States Patent
Mu

(10) Patent No.: US 12,244,536 B2
(45) Date of Patent: Mar. 4, 2025

(54) METHODS FOR TRANSMITTING OR RECEIVING DATA, TERMINAL, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 370 days.

(21) Appl. No.: 17/766,201

(22) PCT Filed: Oct. 11, 2019

(86) PCT No.: PCT/CN2019/110666
§ 371 (c)(1),
(2) Date: Apr. 1, 2022

(87) PCT Pub. No.: WO2021/068209
PCT Pub. Date: Apr. 15, 2021

(65) Prior Publication Data
US 2023/0361971 A1    Nov. 9, 2023

(51) Int. Cl.
*H04W 72/23* (2023.01)
*H04L 5/00* (2006.01)
*H04W 72/1268* (2023.01)

(52) U.S. Cl.
CPC ....... *H04L 5/0055* (2013.01); *H04W 72/1268* (2013.01)

(58) Field of Classification Search
CPC ......... H04L 1/08; H04L 1/189; H04L 1/1896; H04L 5/0055; H04W 72/1268; H04W 72/23
See application file for complete search history.

(56) References Cited

U.S. PATENT DOCUMENTS

| 2019/0053211 A1* | 2/2019 | Ying | H04W 72/044 |
| 2021/0329647 A1* | 10/2021 | Park | H04L 1/0038 |
| 2022/0166550 A1* | 5/2022 | Ye | H04W 52/38 |
| 2022/0330282 A1* | 10/2022 | Kim | H04W 72/1263 |

(Continued)

FOREIGN PATENT DOCUMENTS

| CN | 107431507 A * | 12/2017 | ............... H04B 7/02 |
| CN | 108702784 A | 10/2018 | |

(Continued)

OTHER PUBLICATIONS

International Search Report of PCT Application No. PCT/CN2019/110666 dated Jun. 23, 2020 with English translation, (4p).

(Continued)

*Primary Examiner* — Phuc H Tran
(74) *Attorney, Agent, or Firm* — Arch & Lake LLP

(57) ABSTRACT

A method for transmitting data, includes: obtaining, by a terminal, a set of transmission parameters; receiving downlink control information including an information field; determining a target number of n for times of repeated transmissions based on the set of transmission parameters and the information field, where n is a positive integer; and transmitting data, in a target transmission resource, based on a target transmission mode for the target number of n times.

20 Claims, 6 Drawing Sheets

(56) References Cited

U.S. PATENT DOCUMENTS

| | | | | |
|---|---|---|---|---|
| 2023/0086990 A1* | 3/2023 | Liu | ............................ | H04L 1/08 370/329 |
| 2023/0328754 A1* | 10/2023 | Qiao | ..................... | H04L 1/1887 370/329 |

FOREIGN PATENT DOCUMENTS

| | | | | |
|---|---|---|---|---|
| CN | 109495224 | A | | 3/2019 |
| WO | 2015045079 | A1 | | 4/2015 |
| WO | 2016163502 | A2 | | 10/2016 |
| WO | 2017167198 | A1 | | 10/2017 |
| WO | 2018030228 | A1 | | 2/2018 |
| WO | WO-2020243930 | A1 | * 12/2020 | ............... H04L 1/08 |

OTHER PUBLICATIONS

Huawei, et al., "Enhanced UL Configured Grant Transmission", 3GPP TSG RAN WG1 Meeting #94bis R1-1810159, Chengdu, China, Oct. 8-12, 2018, (9p).

Huawei, et al., "Feature Lead Summary of EDT During RACH in feNB-IoT", 3GPP TSG RAN WG1 Meeting #93bis R1-1807473, Busan, Korea, May 21-25, 2018, (15p).

Huawei, et al., "Enhanced UL Configured Grant Transmissions", 3GPP TSG RAN WG1 Meeting #95, R1-1812226, Spokane, WA, Nov. 12-16, 2018, (10p).

Office Action of Japanese Application No. 2022-52135 dated Oct. 23, 2023 with English translation, (6p).

Extended European Search Report of EP Application No. 19948736.4 dated Sep. 20, 2022, (8p).

First Office Action of Russian Application No. 2022112412 dated Oct. 7, 2022 with English translation, (13p).

Huawei, "CSI and MCS design for LTE URLLC", 3GPP TSG RAN WG1 Meeting #92, R1-1801869, Athens, Greece, Feb. 26-Mar. 2, 2018, (4p).

Nokia, "UL transmission without grant" 3GPP TSG-RAN WG1 Meeting 90bis, R1-1718623, Prague, CA Oct. 9-13, 2017, (3p).

JPOA of Application No. 2022-521356 dated on Apr. 28, 2023 with English translation,(8p).

CNOA of Application No. 201980002448.8 dated on Nov. 5, 2023 with English translation,(10p).

Intel Corporation, "UL data transmission procedures in NR", 3GPP TSG-RAN WG1 Meeting 90bis, R1-1717396, Prague. Czech Republic, Oct. 9-13, 2017, (13p).

* cited by examiner

METHODS FOR TRANSMITTING OR RECEIVING DATA, TERMINAL, AND STORAGE MEDIUM

CROSS-REFERENCE TO RELATED APPLICATION

This application is a U.S. national phase of International Application No. PCT/CN2019/110666, filed on Oct. 11, 2019, the entire content of which is incorporated herein by reference for all purposes.

TECHNICAL FIELD

The disclosure relates to the field of mobile communications, and more particularly, to a method for transmitting data, a method for receiving data, a terminal and a storage medium.

BACKGROUND

Machine-type communication (MTC) technologies and narrow-band Internet of Things (NB-IoT) technologies are more widely applied to low-power wide-area (LPWA) services as the IoT developed rapidly, such as remote reading of water meter data and timing collection of agricultural information.

Since a device in a low-rate service transmits a small amount of data to a base station every time, a large signaling overhead is likely to occur if a conventional long-term-evolution (LTE) data-transmission process is employed, so that an uplink grant-free solution is employed for an LPWA device to transmit data. At the same time, since the LPWA device is deployed in an environment with strong signal interference, it is to employ a manner of repeated transmissions for power accumulation to increase a probability of receiving valid data by the base station from the LPWA device.

SUMMARY

A method for transmitting data is provided. The method includes the following. A set of transmission parameters is obtained. Downlink control information including an information field is received. A target number of n for times of repeated transmissions is determined based on the set of transmission parameters and the information field, where n is a positive integer. Data is transmitted, in a target transmission resource, based on a target transmission mode for the target number of n times.

A method for receiving data is provided. The method includes the following. Downlink control information including an information field is transmitted, in which a terminal is configured to determine a target number n of repeated transmissions based on a set of transmission parameters and the information field. Data from the terminal are received within a preset time and frequency.

A terminal for receiving data is provided. The terminal includes a processor. The terminal includes a memory, where the memory is configured to store at least one instruction, at least one program, a set of codes and a set of instructions, and the at least one instruction, the at least one program, the set of codes and the set of instructions are loaded and executed by the processor to perform the above method for transmitting or receiving data.

BRIEF DESCRIPTION OF THE DRAWINGS

To more clearly describe technical solutions in examples of the disclosure, it will briefly introduce the drawings needed in the description of examples in the following. Obviously, the drawings in the following description are only some examples of the disclosure. For those of ordinary skill in the art, without creative labor, other drawings may be obtained based on these drawings.

DETAILED DESCRIPTION

Figure 1:
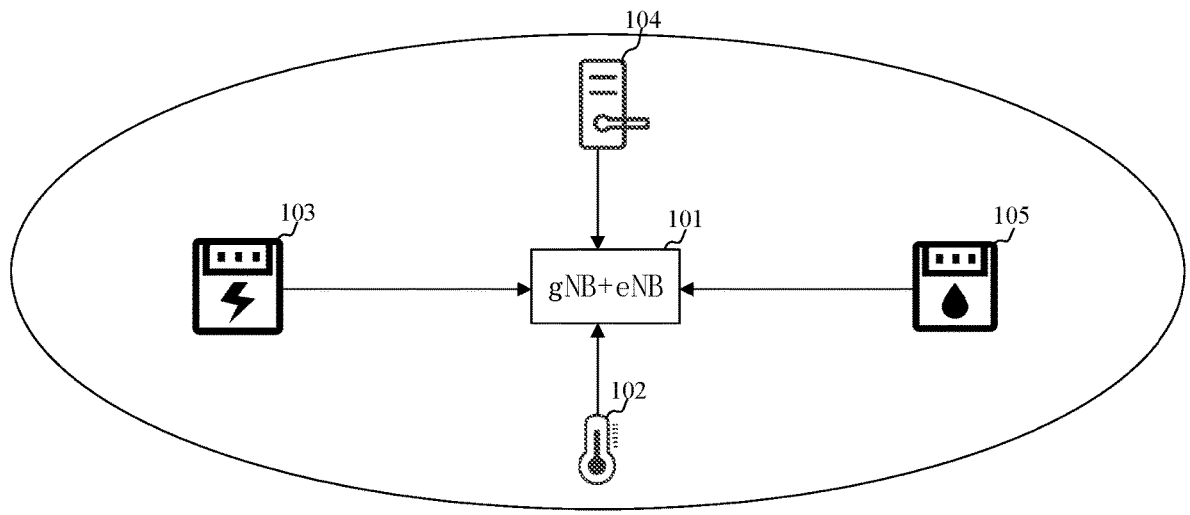
FIG. 1 illustrates a block diagram of a communication system, in some examples of the disclosure.

Reference will now be made in detail to embodiments, examples of which are illustrated in the drawings. The following description refers to the drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Firstly, a brief introduction on terms in embodiments of the disclosure should be made as follows.

LPWA services are derived from IoT technologies. IoT technologies enable a large number of sensing devices and control devices to have connection requirements with LTE base stations (eNB) or new radio (NR) base stations (gNB). These connections have low-rate requirements but are sensitive to power consumption and cost. These connections are widely distributed and have the large quantity. The 3rd-generation mobile communication technology/the 4th-generation mobile communication technology (3G/4G) may not satisfy requirements in terms of cost. Also, the 2nd-generation mobile communication technology (2G) may not satisfy requirements in terms of power consumption.

MTC technologies and NB-IoT technologies are two branches of IoT technologies on LPWA services. NB-IoT technologies and MTC technologies adopt ultra-narrow-band, repeated transmissions, thin network protocols and other designs to sacrifice speed, delay and mobility performance, to obtain a capacity for carrying LPWA services.

Uplink grant-free, means that an eNB configures a transmission resource and a transmission format for a user in advance. When the user has data to transmit, the data is transmitted in a preset mode on a preset resource.

FIG. 1 illustrates a block diagram of a communication system in some embodiments of the disclosure. With reference to FIG. 1, in an LPWA service scenario using NB-IoT/MTC technologies, LPWA devices 102 to 105 are connected to gNB/eNB 101. Illustratively, the LPWA device 102 is a temperature sensor that transmits temperature information to the base station at regular intervals; the LPWA device 103 is a smart electricity meter that transmits electricity consumption information to the base station at regular intervals; the LPWA device 104 is a smart door lock that transmits a lock state to the base station at regular intervals; and the LPWA device 105 is a smart water meter that transmits water usage information to the base station at regular intervals. Optionally, data that transmitted by the LPWA devices 102 to 105 have the same characteristics, that is, the transmission rate is lower and the transmission cost is lower, but an environment of the LPWA devices 102 to 105 is relatively harsh and is not suitable for Sidelink transmission. Optionally, the connection between the gNB/eNB 101 and the LPWA devices 102 to 105 is performed through NB-IoT/MTC technologies. In the case of abandoning speed, delay and mobility performance, data from the LPWA devices 102 to 105 are obtained by formulating a mode of repeated transmissions for the LPWA devices 102 to 105.

Figure 2:
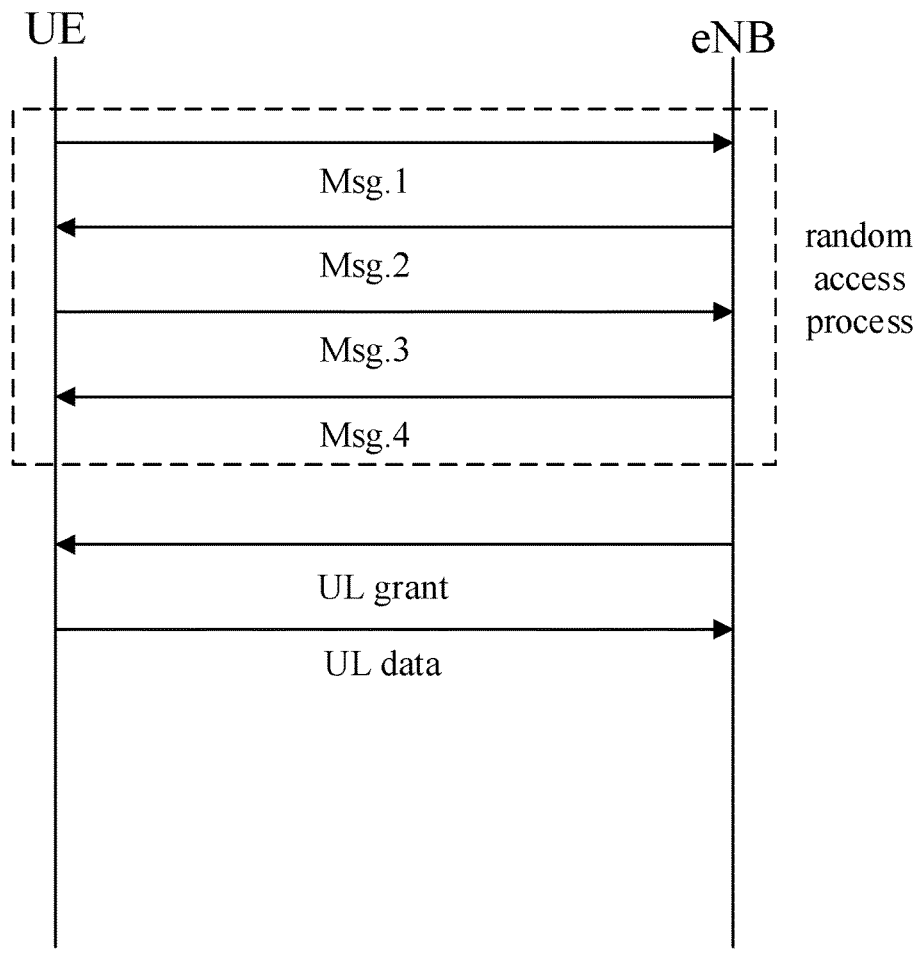
FIG. 2 illustrates a schematic diagram of a data transmission process, in the related art.

FIG. 2 illustrates a schematic diagram of a data transmission process in the related art. With reference to FIG. 2, optionally, the UE in FIG. 2 represents a LPWA device. In the data transmission process between the UE and the eNB in the related art, since the eNB does not allocate a time-frequency resource for the UE in advance, a random access process between the UE and the eNB needs to be performed first. After the random access process is completed, the eNB may transmit an uplink scheduling grant to the UE and the UE may transmit data to the eNB. Optionally, due to the poor environment of the LPWA device and the low power of transmitting data by the LPWA device, it is difficult to connect to the eNB through the random access process. Since a size of data transmitted by the LPWA device every time is small, if the random access process with higher energy consumption is performed before every transmission, the overall loss of the LPWA device may increase and the efficiency may be lower.

Figure 3:
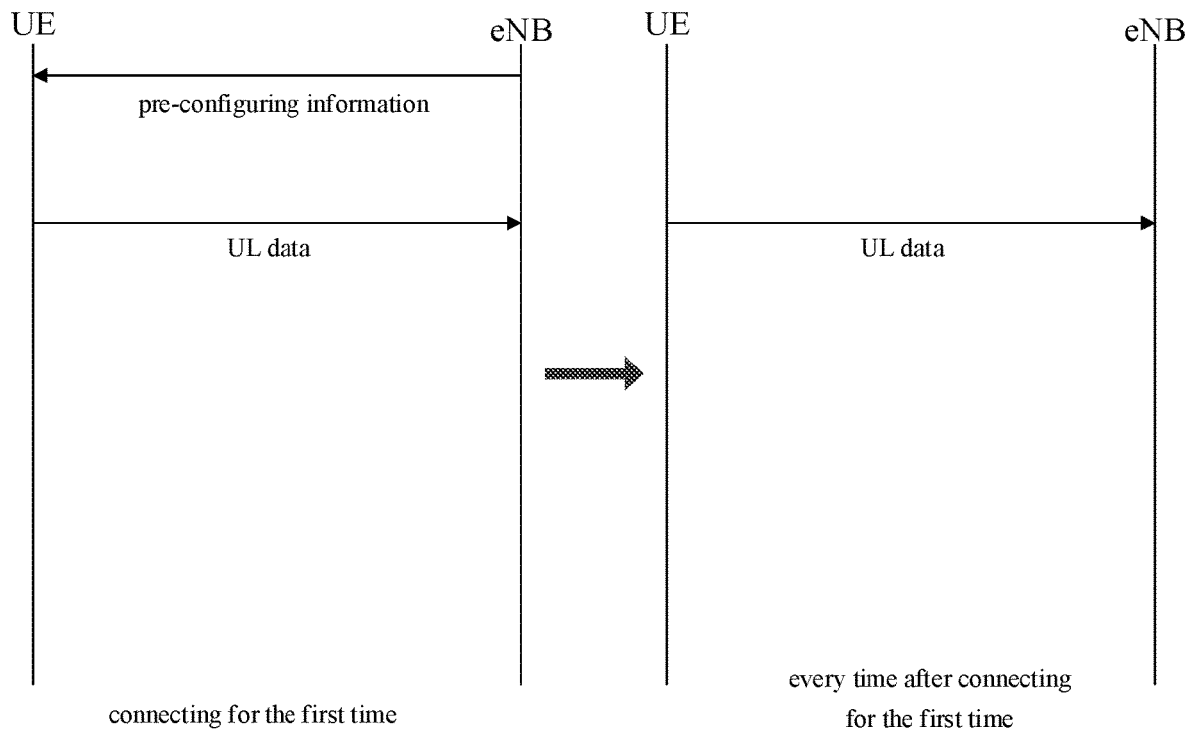
FIG. 3 illustrates a schematic diagram of a data transmission process, in some examples of the disclosure.

FIG. 3 illustrates a schematic diagram of a data transmission process in some embodiments of the disclosure. With reference to FIG. 3, optionally, the UE in FIG. 3 represents a LPWA device. Optionally, the UE and the eNB are connected by an uplink grant-free mode. That is, when connecting for the first time, the eNB pre-configures information required by the UE for data transmission, including at least one of: a time-frequency position of a data channel transmitted by the UE, a size of data transmitted every time, an occurrence period of the data channel reserved for the UE and a format of transmitting data. Optionally, after the first configuration, the UE may transmit data that satisfies the preset size and format to the eNB based on the preset time-frequency position and the occurrence period of the data channel reserved by the eNB for the UE. In other cases, the communication with the eNB is not performed for the UE. Further, since the UE is the LPWA device, the UE may repeatedly transmit data. Through the manner of repeated data transmission, the power can be superimposed on the data when the power of the single transmission is low, so that it can be easily received by the eNB. Therefore, the number of repeated data transmissions needs to be determined to improve the success rate of transmitting data from the UE to the eNB.

A number of repeated transmissions is usually configured by the base station or is determined by selecting a number from a set of numbers through an indicator in downlink control information (DCI) received by the LPWA device.

However, there is no reasonable way to determine the number of repeated transmissions, which leads to a problem of unreasonable number of repeated transmissions for the LPWA device and in turn leads to a low data-transmission-success rate for the LPWA device.

Figure 4:
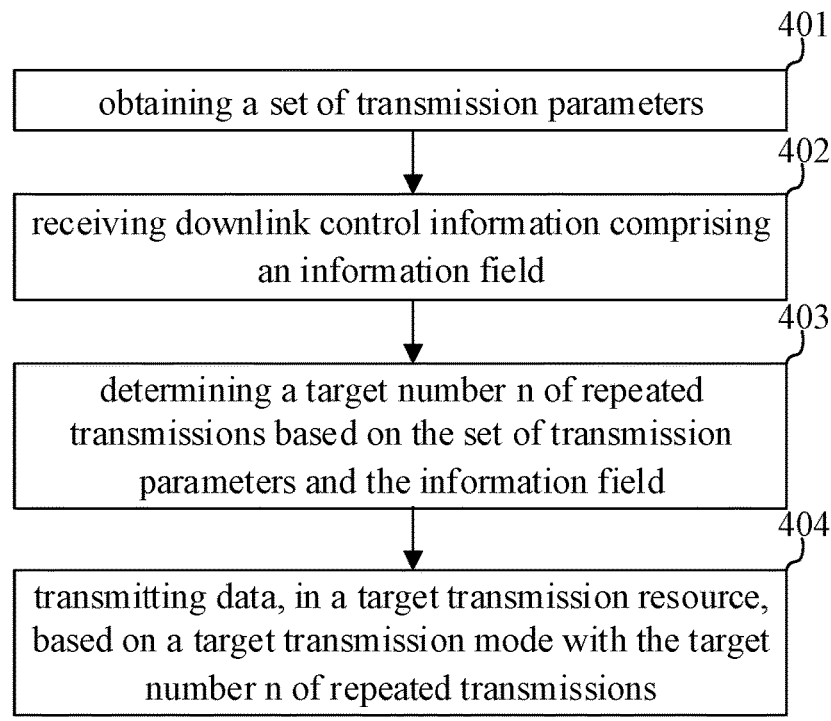
FIG. 4 illustrates a flow chart of a method for transmitting data, in some examples of the disclosure.

FIG. 4 illustrates a flow chart of a method for transmitting data in some embodiments of the disclosure. The method is applicable to a terminal with grant-free scheduling as an example for description. The method includes the following.

In 401, a set of transmission parameters is obtained.

A terminal in some embodiments is a UE that employs the grant-free scheduling. That is, a connection is configured only once between the UE and the base station. In subsequent connections, the UE can directly transmit data of preset format and/or size to the base station through the preset time-frequency resource. Optionally, the UE with grant-free scheduling in some embodiments is a LPWA device.

Optionally, the terminal obtains the set of transmission parameters from grant-free scheduling connection information configured by the base station. That is, when the base station performs the grant-free scheduling connection, the preset transmission resource, the preset format and/or size of data to be transmitted and the set of transmission parameters are included.

Optionally, the set of transmission parameters includes at least one transmission parameter. Optionally, each transmission parameter finally indicates a different target number n of repeated transmissions.

Optionally, the base station configures the set of transmission parameters by transmitting a first configuration signaling. The first configuration signaling includes at least one of: a radio resource control (RRC) signaling, a media access control (MAC) control element (CE) signaling or a physical layer signaling.

In 402, downlink control information (DCI) is received, in which the DCI includes an information field.

Optionally, the DCI is transmitted by the base station to the UE through a channel at the same time when the base station pre-configures the UE. In an example, when the UE connects to the base station for the first time, the base station transmits the DCI to the UE through the channel, in which the DCI includes the information field. In an example, the UE is a LPWA device and the connection between the UE and the base station is not the first time, that is, the UE has already transmitted data to the terminal before the connection. At this time, the terminal may transmit the feedback information to the UE based on the information received from the UE. The feedback information includes the DCI and the DCI includes the information field.

In 403, a target number n of repeated transmissions is determined based on the set of transmission parameters and the information field.

Optionally, the information field included in the DCI is a field having at least 2 bits and it indicates a number in a binary manner. The indicated number represents a corresponding transmission parameter in the set of transmission parameters. In an example, the information field included in the DCI is a field having 3 bits, the binary number indicated by the field of three bits is "110", and the fifth parameter in the set of transmission parameters is indicated by "110". Optionally, the target number n of repeated transmissions is determined by a transmission parameter, corresponding to the number indicated by the information field, in the set of transmission parameters. Optionally, the transmission parameter may be a candidate number of repeated transmissions, that is, the transmission parameter is a parameter that can be used as the target number n of repeated transmissions and is a candidate parameter in the set of transmission parameters, where n is a positive integer. Further, n is a multiple of a positive integer. In an example, n is an integer power of 2.

In 404, data are transmitted, in a target transmission resource, based on a target transmission mode with the target number n of repeated transmissions.

Optionally, the target transmission resource may be a preset transmission resource. Optionally, the preset transmission resource is set during a process of setting the grant-free scheduling. In the process of setting the grant-free scheduling, in addition to the uplink scheduling grant, the base station may configure resources for the UE. Optionally, the base station configures, for the UE, the time-frequency position of the preset transmission resource, the preset transmission mode, the size of the preset transmission resource and the period of data transmission. Optionally, after determining the target number n of repeated transmissions, the UE, based on the configuration of the grant-free scheduling, transmits data in the target transmission resource based on the target transmission mode. Optionally, the target transmission mode is a preset transmission mode.

In conclusion, with the method provided in some embodiments, by obtaining the set of transmission parameters and the information field in the downlink control information, the number of repeated transmissions in the terminal with grant-free scheduling may be determined, so that the number of repeated transmissions is reasonable. This avoids the problem of unreasonable number of repeated transmissions for the LPWA device, due to an inability to determine the reasonable number of repeated transmissions, improving the data-transmission-success rate for the LPWA device.

Figure 5:
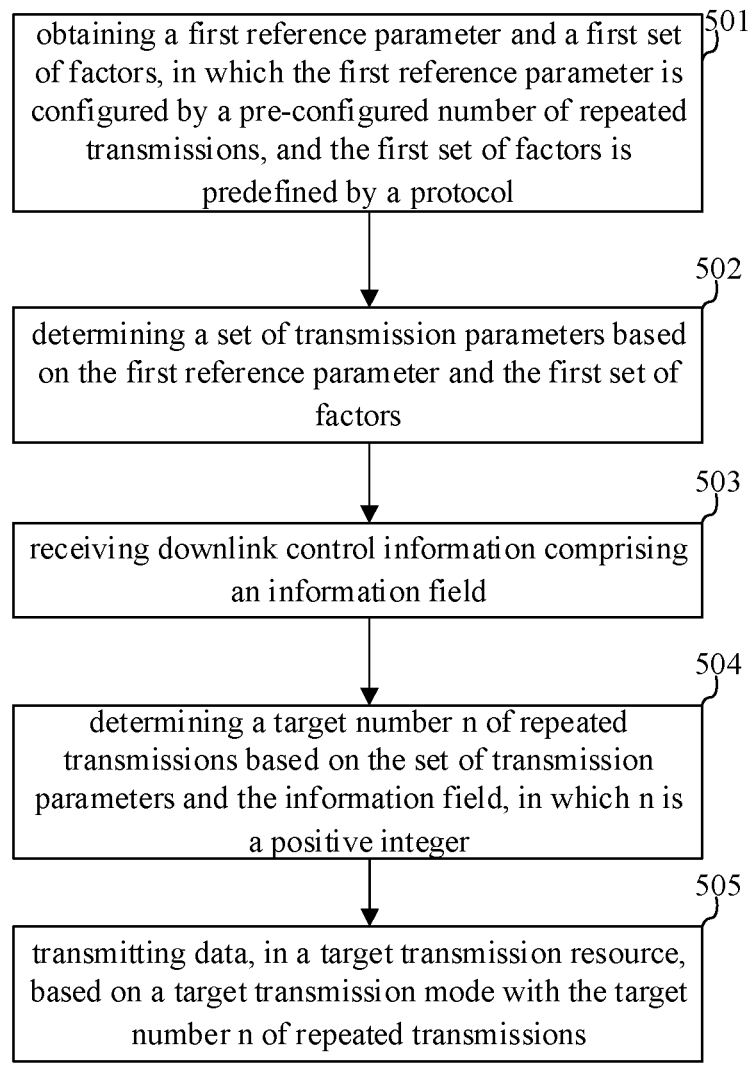
FIG. 5 illustrates a flow chart of a method for transmitting data, in some examples of the disclosure.

FIG. 5 illustrates a flow chart of a method for transmitting data in some embodiments of the disclosure. The method is applicable to a terminal with grant-free scheduling as an example for description. The method includes the following.

In 501, a first reference parameter and a first set of factors are obtained. The first reference parameter is configured by a pre-configured number of repeated transmissions. The first set of factors is predefined by a protocol.

The first reference parameter represents a parameter through which the target number n of repeated transmissions can be obtained and can be used as a reference. Further, the first reference parameter is a positive integer.

The first set of factors is a set that includes at least one factor. Optionally, the factor is a number that can adjust the first reference parameter through a mathematical operation to obtain a further parameter.

Optionally, the first reference parameter is determined based on a configured number of repeated transmissions. In an example, the pre-configured number of repeated transmissions indicates the number of repeated transmissions indicated to the UE by the base station for the first time in the grant-free scheduling process. Further, the pre-configured number of repeated transmissions may be determined as the first reference parameter. At this time, it means that the first set of factors is used to adjust the first reference parameter through the mathematical operation by using factors in the first set of factors. Optionally, the first set of factors at this time is determined by a pre-definition of the protocol, that is, factors are selected through related standards. In an example, the protocol predefines that the target number of repeated transmissions needs to be an integer power of 2. At this time, the first set of factors is a set predefined by the protocol and includes integer powers of 2. Further, according to provisions of the protocol at this time, the first reference parameter also needs to be set to an integer power of 2.

In 502, a set of transmission parameters is determined based on the first reference parameter and the first set of factors.

Optionally, by multiplying the first reference parameter with each factor in the first set of factors, a transmission parameter determined by the first reference parameter corresponding to each factor in the first set of factors can be obtained and all transmission parameters constitute the set of transmission parameters.

Or,

Optionally, by summing the first reference parameter with each factor in the first set of factors, a transmission parameter determined by the first reference parameter corresponding to each factor in the first set of factors can be obtained and all transmission parameters constitute the set of transmission parameters.

In 503, DCI is received, in which the DCI includes an information field.

Optionally, the DCI is transmitted by the base station to the UE through a channel at the same time when the base station pre-configures the UE. In an example, when the UE connects to the base station for the first time, the base station transmits the DCI to the UE through the channel, in which the DCI includes the information field. In an example, the UE is a LPWA device and the connection between the UE and the base station is not the first time, that is, the UE has already transmitted data to the terminal before the connection. At this time, the terminal may transmit the feedback information to the UE based on the information received from the UE. The feedback information includes the DCI and the DCI includes the information field.

In 504, a target number n of repeated transmissions is determined based on the set of transmission parameters and the information field, where n is a positive integer.

Optionally, the information field included in the DCI is a field having at least 2 bits and it indicates a number in a binary manner. The indicated number represents a corresponding transmission parameter in the set of transmission parameters. In an example, the information field included in the DCI is a field having 3 bits, the binary number indicated by the field of three bits is "110", and the fifth parameter in the set of transmission parameters is indicated by "110". Optionally, the target number n of repeated transmissions is determined by a transmission parameter, corresponding to the number indicated by the information field, in the set of transmission parameters. n is a positive integer. Further, n is a multiple of a positive integer. In an example, n is an integer power of 2.

Optionally, the transmission parameter indicated by the information field will be directly used as the target number n of repeated transmissions. At this time, the indicated transmission parameter needs to satisfy the requirement of the protocol or the base station for the target number n of repeated transmissions. In an example, the protocol stipulates that the target number n of repeated transmissions needs to be a positive integer power of 2. The first reference parameter is 2, the first set of factors is {⅛, ¼, ½, 2}, and the obtained set of transmission parameters is {¼, ½, 1, 4}. Since the protocol stipulates that the target number n of repeated transmissions needs to be a positive integer power of 2, at this time, the transmission parameter indicated by the target field only can be 4.

In 505, data are transmitted, in a target transmission resource, based on a target transmission mode with the target number n of repeated transmissions.

Optionally, the target transmission resource may be a preset transmission resource. Optionally, the preset transmission resource is set during a process of setting the grant-free scheduling. In the process of setting the grant-free scheduling, in addition to the uplink scheduling grant, the base station may configure resources for the UE. Optionally, the base station configures, for the UE, the time-frequency position of the preset transmission resource, the preset transmission mode, the size of the preset transmission resource and the period of data transmission. Optionally, after determining the target number n of repeated transmissions, the UE, based on the configuration of the grant-free scheduling, transmits data in the target transmission resource based on the target transmission mode. Optionally, the target transmission mode is a preset transmission mode.

In conclusion, with the method provided in some embodiments, by obtaining the set of transmission parameters and the information field in the downlink control information, the number of repeated transmissions in the terminal with grant-free scheduling may be determined, so that the number of repeated transmissions is reasonable. This avoids the problem of unreasonable number of repeated transmissions for the LPWA device, due to an inability to determine the reasonable number of repeated transmissions, improving the data-transmission-success rate for the LPWA device. By determining the reference parameter indicated by the base station and the set of factors preset by the protocol and determining the set of transmission parameters based on the reference parameter and the set of factors, the final number of repeated transmissions is determined by the actual situation of the terminal and conforms to the relevant protocol regulations, which further improves the data-transmission-success rate for the LPWA device.

Figure 6:
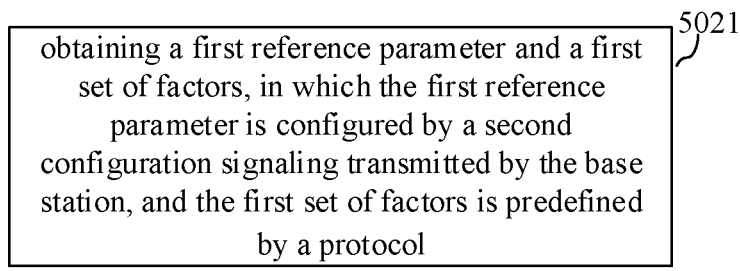
FIG. 6 illustrates a flow chart of a method for transmitting data, in some examples of the disclosure.

In an alternative embodiment based on FIG. 5, FIG. 6 illustrates a flow chart of a method for transmitting data in some embodiments of the disclosure. In some embodiments, 501 can be replaced by 5021. Taking this method as an example to illustrate that the method is applicable to the terminal with grant-free scheduling. The method includes the following.

In 5021, a first reference parameter and a first set of factors are obtained, in which the first reference parameter is configured by a second configuration signaling transmitted by the base station and the first set of factors is predefined by a protocol.

Optionally, the second configuration signaling includes at least one of: an RRC signaling, a MAC CE signaling or a physical layer signaling. Optionally, the second configuration signaling is transmitted by the base station to the UE and configures the first reference parameter for the UE. Optionally, the first reference parameter configured by the second configuration signaling has nothing to do with the number of repeated transmissions indicated to the UE by the base station for the first time in the grant-free scheduling process. Optionally, the configured first reference parameter may be the first reference parameter predefined by the protocol. Optionally, the first set of factors is pre-defined and determined by the protocol.

Figure 7:
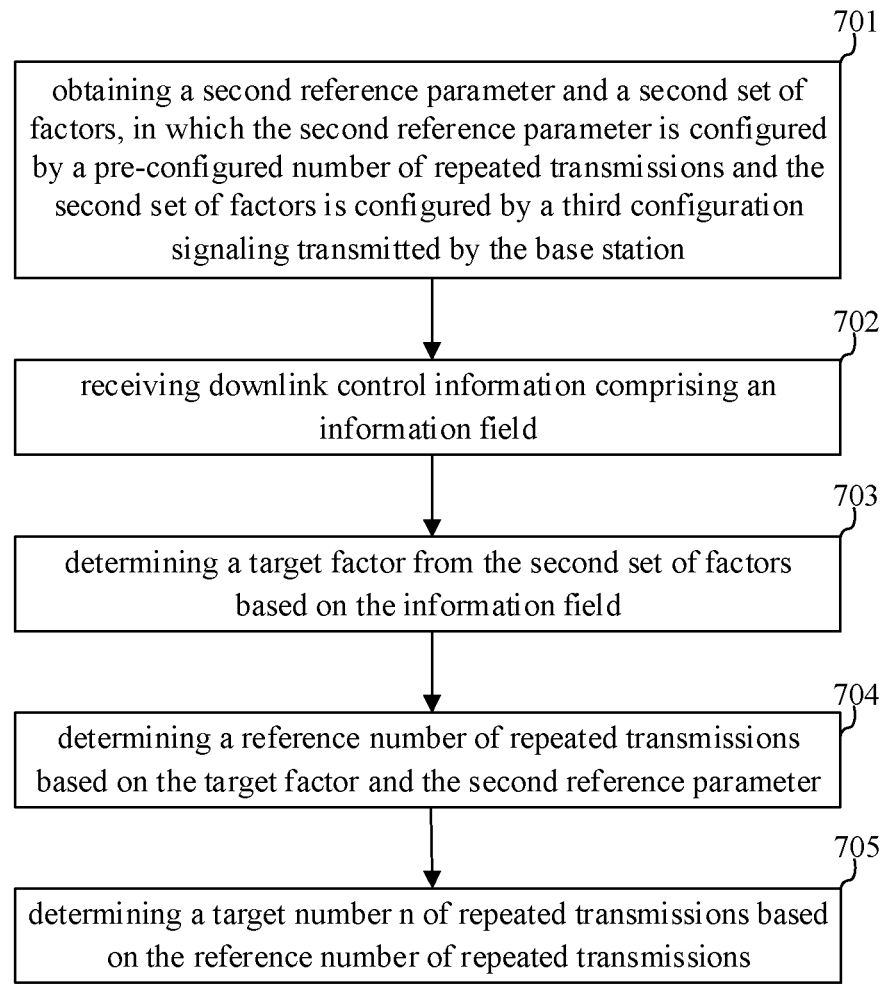
FIG. 7 illustrates a flow chart of a method for transmitting data, in some examples of the disclosure.

Optionally, the first reference parameter and the first set of factors in some embodiments may also be implemented as a second reference parameter and a second set of factors in some embodiments in FIG. 7.

In conclusion, with the method provided in some embodiments, by obtaining the set of transmission parameters and the information field in the downlink control information, the number of repeated transmissions in the terminal with grant-free scheduling may be determined, so that the number of repeated transmissions is reasonable. This avoids the problem of unreasonable number of repeated transmissions for the LPWA device, due to an inability to determine the reasonable number of repeated transmissions, improving the data-transmission-success rate for the LPWA device. By configuring the reference parameter by the base station and presetting the set of factors by the protocol, it may make the selection of the number of repeated transmissions more in line with the requirements of the base station and further improve the data-transmission-success rate.

FIG. 7 illustrates a flow chart of a method for transmitting data in some embodiments of the disclosure. The method is applicable to a terminal with grant-free scheduling as an example for description. The method includes the following.

In 701, a second reference parameter and a second set of factors are obtained, in which the second reference parameter is configured by a pre-configured number of repeated transmissions and the second set of factors is configured by a third configuration signaling transmitted by the base station.

The pre-configured number of repeated transmissions indicates the number of repeated transmissions indicated to the UE by the base station for the first time in the grant-free scheduling process. Further, the pre-configured number of repeated transmissions may be determined as the second reference parameter.

Optionally, the third configuration signaling includes at least one of: an RRC signaling, a MAC CE signaling or a physical layer signaling. Optionally, the third configuration signaling is transmitted by the base station to the UE and configures the second set of factors for the UE. Optionally, the second set of factors configured by the third configuration signaling has nothing to do with the second set of factors specified by the protocol. Optionally, the second set of factors is a set that includes at least one factor. The factor is a number that can adjust the second reference parameter through a mathematical operation to obtain a further parameter.

In 702, DCI is received, in which the DCI includes an information field.

Optionally, the DCI is transmitted by the base station to the UE through a channel at the same time when the base station pre-configures the UE. In an example, when the UE connects to the base station for the first time, the base station transmits the DCI to the UE through the channel, in which the DCI includes the information field. In an example, the UE is a LPWA device and the connection between the UE and the base station is not the first time, that is, the UE has already transmitted data to the terminal before the connection. At this time, the terminal may transmit the feedback information to the UE based on the information received from the UE. The feedback information includes the DCI and the DCI includes the information field.

In 703, a target factor is determined from the second set of factors based on the information field.

Optionally, the information field included in the DCI is a field having at least 2 bits and it indicates a number in a binary manner. The indicated number represents a corresponding transmission parameter in the set of transmission parameters. In an example, the information field included in the DCI is a field having 3 bits, the binary number indicated by the field of three bits is "110", and the fifth factor in the second set of factors is indicated by "110". That is, the fifth factor in the second set of factors is selected as the target factor.

In 704, a reference number of repeated transmissions is determined based on the target factor and the second reference parameter.

Optionally, the reference number of repeated transmissions is determined by performing a mathematical operation on the target factor and the second reference parameter. Optionally, the mathematical operation is configured by the base station during the grant-free scheduling process.

In an example, the target factor is 2, the second reference parameter is 8, and the mathematical operation configured by the base station during the grant-free scheduling process is to multiply the target factor and the second reference parameter to obtain the reference number of repeated transmissions. At this time, the obtained reference number of repeated transmissions is 2×8=16.

In an example, the target factor is 3, the second reference parameter is 6, and the mathematical operation configured by the base station during the grant-free scheduling process is to add the target factor and the second reference parameter to obtain the reference number of repeated transmissions. At this time, the obtained reference number of repeated transmissions is 3+6=9.

In 705, a target number n of repeated transmissions is determined based on the reference number of repeated transmissions.

Optionally, the target number n of repeated transmissions needs to be a number in a set of target numbers of repeated transmissions. Optionally, the set of target numbers of repeated transmissions is a set of candidate target numbers of repeated transmissions. Optionally, each candidate target number of repeated transmissions in the set of target numbers of repeated transmissions may satisfy the same mathematical condition. In an example, each candidate target number of repeated transmissions in the set of target numbers of repeated transmissions is an integer power of 2. In an example, each candidate target number of repeated transmissions in the set of target numbers of repeated transmissions is a multiple of a preset value.

When the reference number of repeated transmissions determined based on the target factor and the second reference parameter does not belong to the set of target numbers of repeated transmissions, a value in the set of target numbers of repeated transmissions, which is greater than or equal to the reference number of repeated transmissions and has a smallest difference from the reference number of repeated transmissions, is selected as the target number n of repeated transmissions.

In an example, each candidate target number of repeated transmissions in the set of target numbers of repeated transmissions is a multiple of 3 and the set of target numbers of repeated transmissions is {21, 24, 27, 30}. The target factor is 5 and the second reference parameter is 5. The mathematical operation configured by the base station during the grant-free scheduling process is to multiply the target factor and the second reference parameter to obtain the reference number of repeated transmissions. The obtained reference number of repeated transmissions at this time is 5×5=25, which does not belong to the set of target numbers of repeated transmissions. A number greater than or equal to 25 and having the smallest difference from 25 in the set of target numbers of repeated transmissions, that is, 27, is selected as the target number n of repeated transmissions.

In an example, each candidate target number of repeated transmissions in the set of target numbers of repeated transmissions is a positive integer power of 2 and the set of target numbers of repeated transmissions is {8, 16, 32, 64}. The target factor is 12 and the second reference parameter is 6. The mathematical operation configured by the base station during the grant-free scheduling process is to add the target factor and the second reference parameter to obtain the reference number of repeated transmissions. The obtained reference number of repeated transmissions at this time is 6+12=18, which does not belong to the set of target numbers of repeated transmissions. A number greater than or equal to 18 and having the smallest difference from 18 in the set of target numbers of repeated transmissions, that is, 32, is selected as the target number n of repeated transmissions.

Further, during the configuration of the base station, the target factor and the second reference parameter are pre-configured, so that the target factor and the second reference parameter are subjected to the mathematical operation configured by the base station during the grant-free scheduling process and the obtained reference number of repeated transmissions is not greater than the maximum value in the set of target numbers of repeated transmissions.

Optionally, the second reference parameter and the second set of factors in some embodiments may also be implemented as the first reference parameter and the first set of factors in some embodiments in FIG. 5 or FIG. 6.

In conclusion, with the method provided in some embodiments, by obtaining the set of transmission parameters and the information field in the downlink control information, the number of repeated transmissions in the terminal with grant-free scheduling may be determined, so that the number of repeated transmissions is reasonable. This avoids the problem of unreasonable number of repeated transmissions for the LPWA device, due to an inability to determine the reasonable number of repeated transmissions, improving the data-transmission-success rate for the LPWA device. By selecting the pre-configured number of repeated transmissions as the reference parameter and configuring the set of factors by the third configuration signaling, obtaining the reference number of repeated transmissions by the mathematical operation, and determining the target number n of repeated transmissions based on the reference number of repeated transmissions, the number of repeated transmissions is further fine-tuned, which can better match channel conditions of the UE, thereby further improving the data-transmission-success rate for the LPWA device.

Figure 8:
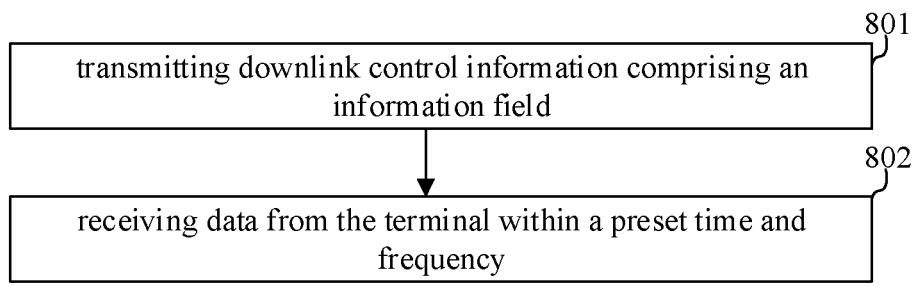
FIG. 8 illustrates a flow chart of a method for receiving data, in some examples of the disclosure.

FIG. 8 illustrates a flow chart of a method for receiving data, in some embodiments of the disclosure. The method is applicable to a base station as an example for description. The method includes the following.

In 801, DCI including an information field is transmitted.

Optionally, the DCI is transmitted by the base station to the UE through a channel at the same time when the base station pre-configures the UE. In an example, when the UE connects to the base station for the first time, the base station transmits the DCI to the UE through the channel, in which the DCI includes the information field. In an example, the UE is a LPWA device and the connection between the UE and the base station is not the first time, that is, the UE has already transmitted data to the terminal before the connection. At this time, the terminal may transmit the feedback information to the UE based on the information received from the UE. The feedback information includes the DCI and the DCI includes the information field.

In 802, data from the terminal are received within a preset time and frequency.

Optionally, the preset transmission resource is set during a process of setting the grant-free scheduling. In the process of setting the grant-free scheduling, in addition to the uplink scheduling grant, the base station may configure resources for the UE. Optionally, the base station configures, for the UE, the time-frequency position of the preset transmission resource, the preset transmission mode, the size of the preset transmission resource and the period of data transmission. Optionally, the base station receives data from the UE based on the preset time-frequency resource and period of data transmission.

Further, after receiving the data from the UE, the base station will feedback a reception situation. The feedback way includes transmitting information including a response character to the UE. Optionally, the response character includes an acknowledge character (ACK) and a negative acknowledge character (NACK). After receiving the information including the response character, the UE will adjust the target number n of repeated transmissions according to the response character. Optionally, the DCI also includes a retransmission instruction. When the information received by the UE includes a NACK, the UE resets the target number n of repeated transmissions based on the retransmission instruction. Optionally, the reset manner includes, but is not limited to, directly configuring the new target number n of repeated transmissions by the terminal and performing a mathematical operation on the original target number n of repeated transmissions.

In conclusion, with the method provided in some embodiments, by transmitting the DCI and receiving the data from the terminal within the preset time and frequency, the data transmitted by the repeated transmissions may be received. Further, by feeding back on the received data, the data that has not been successfully transmitted is fed back in time, which further improves the data-transmission-success rate for the LPWA device.

Figure 9:
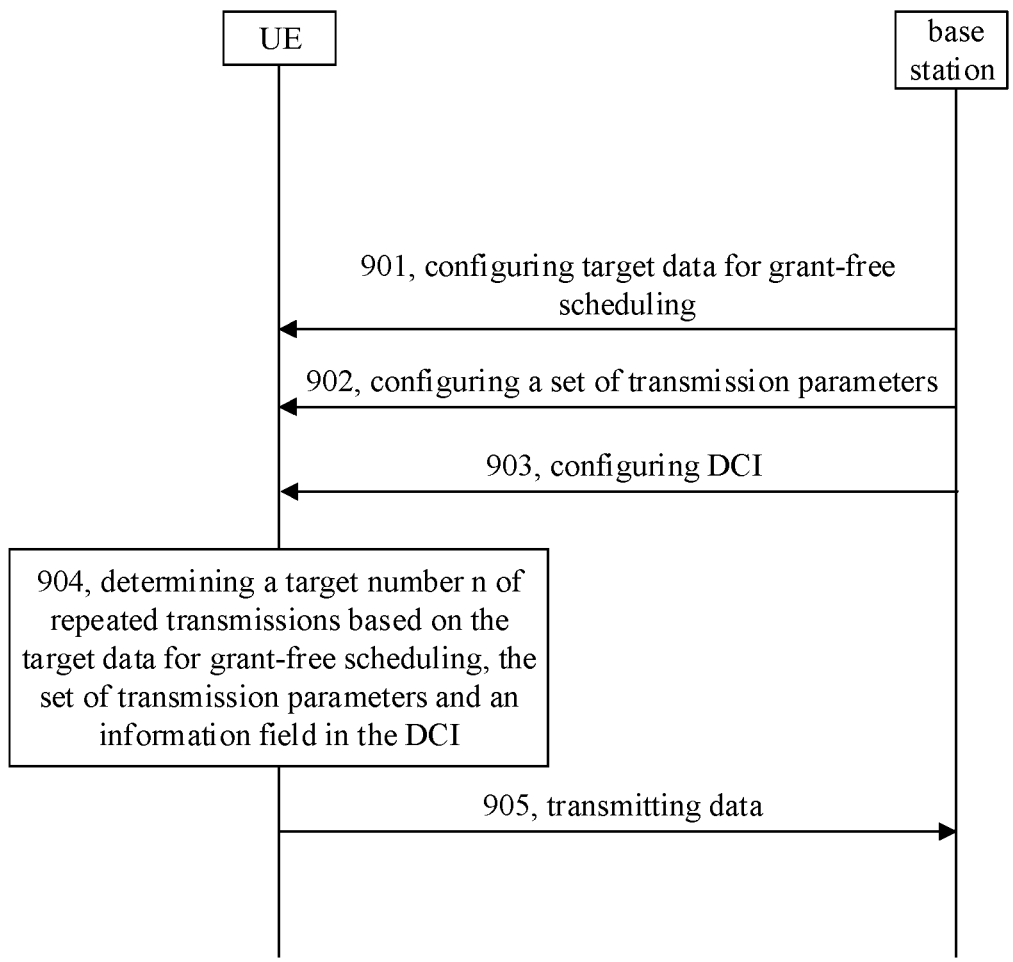
FIG. 9 illustrates a flow chart of a method for transmitting and receiving data, in some examples of the disclosure.

FIG. 9 illustrates a flow chart of a method for transmitting and receiving data, in some embodiments of the disclosure. The method is applicable to a UE and a base station as an example for description. The method includes the following.

In 901, the base station configures target data for grant-free scheduling to the UE.

In the process of setting the grant-free scheduling, in addition to the uplink scheduling grant, the base station may configure resources to the UE. Optionally, the target data may be preset data. Optionally, the base station configures the time-frequency position of the preset transmission resource, the preset transmission mode, the size of the preset transmission resource and the period of data transmission to the UE.

In 902, the base station configures a set of transmission parameters to the UE.

Optionally, the set of transmission parameters includes at least one transmission parameter. Optionally, each transmission parameter finally indicates a different target number n of repeated transmissions.

Optionally, the base station configures the set of transmission parameters by transmitting a first configuration signaling. The first configuration signaling includes at least one of: a RRC signaling, a MAC CE signaling or a physical layer signaling.

Optionally, obtaining the set of transmission parameters includes obtaining a reference parameter and obtaining a set of factors. The reference parameter and the set of factors are used to determine the set of transmission parameters.

Optionally, the reference parameter is configured by a second configuration signaling transmitted by the base station and the second configuration signaling includes at least one of: a RRC signaling, a MAC CE signaling or a physical layer signaling. Or, the reference parameter is configured by a pre-configured number of repeated transmissions.

Optionally, the set of factors is configured by a third configuration signaling transmitted by the base station and the third configuration signaling includes at least one of: a RRC signaling, a MAC CE signaling or a physical layer signaling. Or, the set of factors is is predefined by a protocol.

In 903, the base station configures DCI to the UE.

Optionally, the DCI is transmitted by the base station to the UE through a channel at the same time when the base station pre-configures the UE. In an example, when the UE connects to the base station for the first time, the base station transmits the DCI to the UE through the channel, in which the DCI includes the information field. In an example, the UE is a LPWA device and the connection between the UE and the base station is not the first time, that is, the UE has already transmitted data to the terminal before the connection. At this time, the terminal may transmit the feedback information to the UE based on the information received from the UE. The feedback information includes the DCI and the DCI includes the information field.

In 904, a target number n of repeated transmissions is determined based on the target data for grant-free scheduling, the set of transmission parameters and an information field in the DCI.

Optionally, the target number n of repeated transmissions may directly be indicated by the information field on transmission parameters in the set of transmission parameters.

Optionally, the target number n of repeated transmissions may be determined by a reference number of repeated transmissions on the target transmission parameters.

In 905, data are transmitted.

Optionally, the base station configures, for the UE, the time-frequency position of the preset transmission resource, the preset transmission mode, the size of the preset transmission resource and the period of data transmission. Optionally, after determining the target number n of repeated transmissions, the UE, based on the configuration of the grant-free scheduling, transmits the data in the target transmission resource based on the target transmission mode.

Further, after receiving the data from the UE, the base station will feedback a reception situation. The feedback way includes transmitting information including a response character to the UE. Optionally, the response character includes an ACK and a NACK. After receiving the information including the response character, the UE will adjust the target number n of repeated transmissions according to the response character.

In conclusion, with the method provided in some embodiments, by obtaining the set of transmission parameters and the information field in the downlink control information, the number of repeated transmissions in the terminal with grant-free scheduling may be determined, so that the number of repeated transmissions is reasonable. This avoids the problem of unreasonable number of repeated transmissions for the LPWA device, due to an inability to determine the reasonable number of repeated transmissions, improving the data-transmission-success rate for the LPWA device. Through multiple manners of determining the number of repeated transmissions, the number of repeated transmissions can be further determined from the base station side or the terminal side. Further, by feeding back on the received data, the data that has not been successfully transmitted is fed back in time, which further improves the data-transmission-success rate for the LPWA device.

Figure 10:
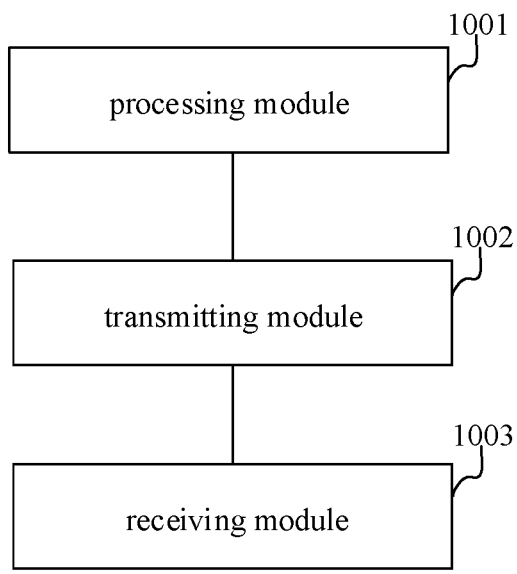
FIG. 10 illustrates a block diagram of an apparatus for transmitting data, in some examples of the disclosure.

FIG. 10 illustrates a block diagram of an apparatus for transmitting data, in some embodiments of the disclosure. The apparatus can be implemented as a whole or a part of a terminal through software, hardware or a combination of software and hardware. The apparatus includes a processing module 1001, a receiving module 1002 and a transmitting module 1003.

The processing module 1001 is configured to obtain a set of transmission parameters.

The receiving module 1002 is configured to receive downlink control information including an information field.

The processing module 1001 is further configured to determine a target number n of repeated transmissions based on the set of transmission parameters and the information field, where n is a positive integer.

The transmitting module 1003 is configured to transmit data, in a target transmission resource, based on a target transmission mode with the target number n of repeated transmissions.

In some embodiments, the processing module 1001 is configured to determine a target candidate number of repeated transmissions in the set of transmission parameters based on the information field as the target number n of repeated transmissions.

In some embodiments, the set of transmission parameters includes at least one candidate number of repeated transmissions.

The receiving module 1002 is configured to receive a first configuration signaling for configuring the set of transmission parameters from a base station.

The first configuration signaling includes at least one of: a RRC signaling, a MAC CE signaling or a physical layer signaling.

In some embodiments, the processing module 1001 is configured to obtain a first reference parameter and a first set of factors.

The processing module 1001 is configured to determine the set of transmission parameters based on the first reference parameter and the first set of factors.

In some embodiments, the processing module 1001 is configured to determine the set of transmission parameters based on a product of the first reference parameter and each factor in the first set of factors.

Or,

The processing module 1001 is configured to determine the set of transmission parameters based on a sum of the first reference parameter and each factor in the first set of factors.

In some embodiments, the receiving module 1002 is configured to receive a second configuration signaling for configuring the first reference parameter from a base station, in which the second configuration signaling includes at least one of: a RRC signaling, a MAC CE signaling or a physical layer signaling.

Or,

The processing module 1001 is configured to determine the first reference parameter based on a pre-configured number of repeated transmissions, in which the pre-configured number of repeated transmissions is a number of repeated transmissions configured by the base station when performing grant-free scheduling.

Or,

The processing module 1001 is configured to determine the first reference parameter based on a configured number of repeated transmissions.

In some embodiments, the receiving module 1002 is configured to receive a third configuration signaling for configuring the first set of factors from a base station, in which the third configuration signaling includes at least one of: a RRC signaling, a MAC CE signaling or a physical layer signaling.

Or,

The first set of factors is determined by pre-defining of a protocol.

In some embodiments, the set of transmission parameters includes a second set of factors and the second set of factors includes at least one factor parameter.

The processing module 1001 is configured to obtain a second reference parameter.

The processing module 1001 is configured to determine a target factor from the second set of factors based on the information field.

The processing module 1001 is configured to determine a reference number of repeated transmissions based on the target factor and the second reference parameter.

The processing module 1001 is configured to determine the target number n of repeated transmissions based on the reference number of repeated transmissions.

In some embodiments, the factor parameter includes at least one of a product factor and a difference factor.

The reference number of repeated transmissions is a product of the target factor and the second reference parameter in response to that the target factor is the product factor.

Or,

The reference number of repeated transmissions is a sum of the target factor and the second reference parameter in response to that the target factor is the difference factor.

In some embodiments, the set of transmission parameters includes a set of target numbers of repeated transmissions.

The processing module 1001 is configured to determine the target number n of repeated transmissions based on the reference number of repeated transmissions and the set of target numbers of repeated transmissions.

The target number n of repeated transmissions is a value, in the set of target numbers of repeated transmissions, that is greater than or equal to the reference number of repeated transmissions and has a smallest difference from the reference number of repeated transmissions, and the set of target numbers of repeated transmissions includes at least one candidate target number of repeated transmissions.

In some embodiments, each candidate target number of repeated transmissions in the set of target numbers of repeated transmissions is an integer power of 2.

Or,

Each candidate target number of repeated transmissions in the set of target numbers of repeated transmissions is a multiple of a preset value.

In some embodiments, the receiving module 1002 is configured to receive a second configuration signaling for configuring the second reference parameter from a base station, in which the second configuration signaling includes at least one of: a RRC signaling, a MAC CE signaling or a physical layer signaling.

Or,

The processing module 1001 is configured to determine the second reference parameter based on a pre-configured number of repeated transmissions, in which the pre-configured number of repeated transmissions is a number of repeated transmissions configured by the base station when performing grant-free scheduling.

Or,

The processing module 1001 is configured to determine the second reference parameter based on a configured number of repeated transmissions.

In some embodiments, the receiving module 1002 is configured to receive a third configuration signaling for configuring the second set of factors from a base station, in which the third configuration signaling includes at least one of: a RRC signaling, a MAC CE signaling or a physical layer signaling.

Or,

The second set of factors is determined by pre-defining of a protocol.

In some embodiments, the downlink control information further includes a retransmission instruction.

The processing module 1001 is configured to reset the target number n of repeated transmissions based on the retransmission instruction.

It should be noted that the apparatus for transmitting data provided in the above-mentioned embodiments employs the division of the above-mentioned functional modules as an example. In practical applications, the above-mentioned functions can be allocated by different functional modules as needed, that is, the internal structure of the apparatus are divided into different functional modules to complete all or part of the functions described above.

Figure 11:
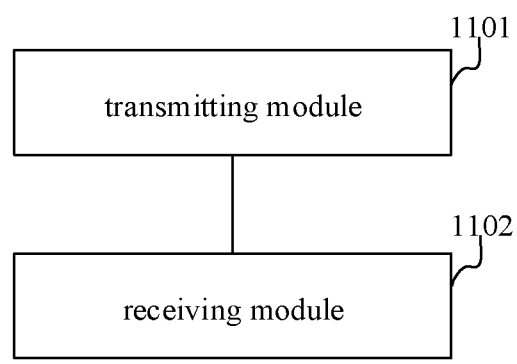
FIG. 11 illustrates a block diagram of an apparatus for receiving data, in some examples of the disclosure.

FIG. 11 illustrates a block diagram of an apparatus for receiving data, in some embodiments of the disclosure. The apparatus can be implemented as a whole or a part of a terminal through software, hardware or a combination of software and hardware. The apparatus includes a transmitting module 1101 and a receiving module 1102.

The transmitting module 1101 is configured to transmit downlink control information including an information field, in which a terminal is configured to determine a target number n of repeated transmissions based on a set of transmission parameters and the information field.

The receiving module 1102 is configured to receive data from the terminal within a preset time and frequency.

In some embodiments, the transmitting module 1101 is configured to transmit a first configuration signaling for configuring the set of transmission parameters to the terminal.

The first configuration signaling includes at least one of: a RRC signaling, a MAC CE signaling or a physical layer signaling.

In some embodiments, the set of transmission parameters is obtained based on a reference parameter and a set of factors.

In some embodiments, the transmitting module 1101 is configured to transmit a second configuration signaling for configuring the reference parameter to the terminal.

The second configuration signaling includes at least one of: a RRC signaling, a MAC CE signaling or a physical layer signaling.

In some embodiments, the transmitting module 1101 is configured to transmit a third configuration signaling for configuring the set of factors to the terminal.

The third configuration signaling includes at least one of: a RRC signaling, a MAC CE signaling or a physical layer signaling.

It should be noted that the apparatus for receiving data provided in the above-mentioned embodiments employs the division of the above-mentioned functional modules as an example. In practical applications, the above-mentioned functions can be allocated by different functional modules as needed, that is, the internal structure of the apparatus are divided into different functional modules to complete all or part of the functions described above.

Figure 12:
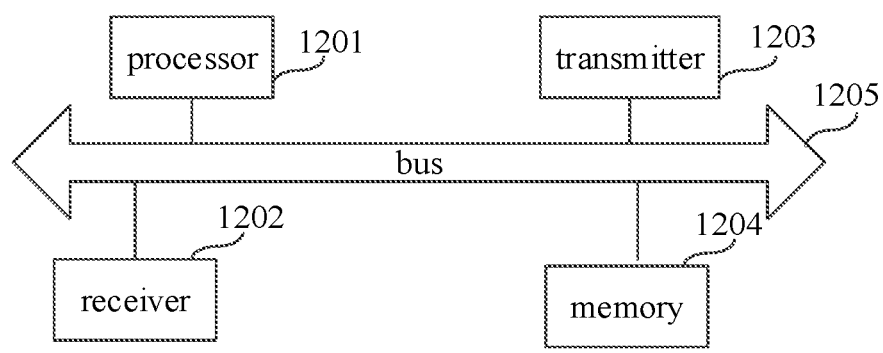
FIG. 12 is a block diagram of a terminal for transmitting and receiving data, in some examples of the disclosure.

FIG. 12 is a block diagram of a terminal for transmitting and receiving data, in some embodiments of the disclosure. The UE includes the following.

A processor 1201 includes one or more processing cores. The processor 1201 executes various functional applications and information processing by running software programs and modules.

A receiver 1202 and a transmitter 1203 may be implemented as a communication component. The communication component may be a communication chip.

A memory 1204 is coupled to the processor 1201 through a bus 1205.

The memory 1204 is configured to store at least one instruction. The processor 1201 is configured to execute the at least one instruction to implement each action in the foregoing method embodiments.

The disclosure also provides a computer device including a memory and a processor. The memory is configured to store at least one instruction, at least one program, a set of codes and a set of instructions. The at least one instruction, the at least one program, the set of codes and the set of instructions are loaded and executed by a processor to perform the method for receiving data or the method for receiving data.

The disclosure also provides a computer-readable storage medium. The readable storage medium stores at least one instruction, at least one program, a set of codes and a set of instructions, and the at least one instruction. The at least one instruction, the at least one program, the set of codes and the set of instructions are loaded and executed by a processor to perform the method for receiving data or the method for receiving data.

The disclosure also provides a computer program product, in which when the computer program product runs on a computer, the computer is caused to perform the method for receiving data or the method for receiving data.

Those of ordinary skill in the art can understand that all or part of actions in the various methods of the above-mentioned embodiments can be completed by a program instructing relevant hardware. The program can be stored in a computer-readable storage medium. The medium may be a computer-readable storage medium included in the memory in the foregoing embodiments; or a computer-readable storage medium that exists alone and is not assembled into the terminal. The computer-readable storage medium stores at least one instruction, at least one program, a set of codes and a set of instructions. The at least one instruction, the at least one program, the set of codes and the set of instructions are loaded and executed by a processor to perform the method for receiving data or the method for receiving data.

Optionally, the computer-readable storage medium may include a read only memory (ROM), a random access memory (RAM), a solid state drive (SSD), an optical disk and the like. The RAM may include a resistive random access memory (ReRAM) and a dynamic random access memory (DRAM). The serial numbers of the foregoing embodiments of the disclosure are only for description, and do not represent the advantages and disadvantages of embodiments.

Those of ordinary skill in the art can understand that all or part of actions in the above embodiments can be implemented by hardware or by a program instructing relevant hardware to complete. The program can be stored in a computer-readable storage medium, as mentioned above. The storage medium can be a read-only memory, a magnetic disk, an optical disk or the like.

The above are only optional embodiments of the disclosure. Any modification, equivalent replacement, improvement, etc. made within the spirit and principle of the disclosure shall be included in the scope of the disclosure.

The communication systems and service scenarios described in the embodiments of the disclosure are intended to more clearly illustrate the technical solutions of the embodiments of the disclosure, and do not constitute a limitation to the technical solutions provided in the embodiments of the disclosure. Those of ordinary skill in the art will know that the technical solutions provided in the embodiments of the disclosure are equally applicable to similar technical problems as the communication system developed and new service scenarios emerged.

It should be understood that "multiple or a plurality of" mentioned herein refers to two or more. "And/or" describes the associated relationship of associated objects, and indicates that there are three types of relationships, for example, A and/or B, which means: A exists alone, A and B exist at the same time, and B exists alone. The character "/" generally indicates that associated objects are in an "or" relationship.

Other embodiments of the disclosure will be apparent to those of ordinary skill in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the drawings, and that various modifications and changes can be made without departing from the scope thereof. It is intended that the scope of the disclosure only be limited by the appended claims.

What is claimed is:

1. A method for transmitting data, comprising:
    obtaining, by a terminal, a set of transmission parameters, wherein the set of transmission parameters comprises at least one candidate number of repeated transmissions;
    receiving, by the terminal, downlink control information comprising an information field;
    determining, by the terminal, a target candidate number of repeated transmissions in the set of transmission parameters based on the information field as a target number of n for times of repeated transmissions, wherein n is a positive integer; and
    transmitting data, in a target transmission resource, based on a target transmission mode for the target number of n for times of repeated transmissions.

2. The method as claimed in claim 1, further comprising:
    receiving, a first configuration signaling for configuring the set of transmission parameters, from a base station;
    wherein the first configuration signaling comprises at least one of: a radio resource control (RRC) signaling, a media access control (MAC) control element (CE) signaling or a physical layer signaling.

3. The method as claimed in claim 1, wherein obtaining the set of transmission parameters comprises:
    obtaining a first reference parameter and a first set of factors; and
    determining the set of transmission parameters based on the first reference parameter and the first set of factors.

4. The method as claimed in claim 3, wherein determining the set of transmission parameters based on the first reference parameter and the first set of factors comprises:
    determining the set of transmission parameters based on a product of the first reference parameter and each factor in the first set of factors; or
    determining the set of transmission parameters based on a sum of the first reference parameter and each factor in the first set of factors.

5. The method as claimed in claim 3, further comprising:
    receiving, a second configuration signaling for configuring the first reference parameter, from a base station, wherein the second configuration signaling comprises at least one of: a radio resource control (RRC) signaling, a media access control (MAC) control element (CE) signaling or a physical layer signaling; or
    determining the first reference parameter based on a pre-configured number of repeated transmissions, wherein the pre-configured number of repeated transmissions is a number of repeated transmissions configured by the base station when performing grant-free scheduling; or determining the first reference parameter based on a configured number of repeated transmissions.

6. The method as claimed in claim 3, further comprising:
receiving, a third configuration signaling for configuring the first set of factors, from a base station, wherein the third configuration signaling comprises at least one of: a radio resource control (RRC) signaling, a media access control (MAC) control element (CE) signaling or a physical layer signaling; or determining the first set of factors by pre-defining of a protocol.

7. The method as claimed in claim 1, wherein the set of transmission parameters comprises a second set of factors and the second set of factors comprises at least one factor parameter; and
wherein determining the target number of n for the times of repeated transmissions based on the set of transmission parameters and the information field comprises:
obtaining a second reference parameter;
determining a target factor from the second set of factors based on the information field;
determining a reference number of repeated transmissions based on the target factor and the second reference parameter; and
determining the target number of n for the times of repeated transmissions based on the reference number of repeated transmissions.

8. The method as claimed in claim 7, wherein the factor parameter comprises at least one of a product factor and a difference factor;
the reference number of repeated transmissions is a product of the target factor and the second reference parameter in response to that the target factor is the product factor, or,
the reference number of repeated transmissions is a sum of the target factor and the second reference parameter in response to that the target factor is the difference factor.

9. The method as claimed in claim 7, wherein the set of transmission parameters comprises a set of target numbers of repeated transmissions,
determining the target number of n for the times of repeated transmissions based on the reference number of repeated transmissions comprises:
determining the target number of n for the times of repeated transmissions based on the reference number of repeated transmissions and the set of target numbers of repeated transmissions,
wherein the target number n of repeated transmissions is a value, in the set of target numbers of repeated transmissions, that is greater than or equal to the reference number of repeated transmissions and has a smallest difference from the reference number of repeated transmissions, and the set of target numbers of repeated transmissions comprises at least one candidate target number of repeated transmissions.

10. The method as claimed in claim 9, wherein,
each candidate target number of repeated transmissions in the set of target numbers of repeated transmissions is an integer power of 2; or,
each candidate target number of repeated transmissions in the set of target numbers of repeated transmissions is a multiple of a preset value.

11. The method as claimed in claim 7, further comprising:
receiving, a second configuration signaling for configuring the second reference parameter, from a base station, wherein the second configuration signaling comprises at least one of: a radio resource control (RRC) signaling, a media access control (MAC) control element (CE) signaling or a physical layer signaling; or
determining the second reference parameter based on a pre-configured number of repeated transmissions, wherein the pre-configured number of repeated transmissions is a number of repeated transmissions configured by the base station when performing grant-free scheduling; or
determining the second reference parameter based on a configured number of repeated transmissions.

12. The method as claimed in claim 7, further comprising:
receiving, a third configuration signaling for configuring the second set of factors, from a base station, wherein the third configuration signaling comprises at least one of: a radio resource control (RRC) signaling, a media access control (MAC) control element (CE) signaling or a physical layer signaling; or
determining the second set of factors by pre-defining of a protocol.

13. The method as claimed in claim 1, wherein the downlink control information further comprises a retransmission instruction; and
the method further comprises:
resetting the target number of n for the times of repeated transmissions based on the retransmission instruction.

14. A method for receiving data, comprising:
transmitting, by a base station, downlink control information comprising an information field, wherein a terminal is configured to determine a target number of n for times of repeated transmissions based on a set of transmission parameters and the information field; and
receiving, by the base station, data from the terminal within a preset time and frequency, wherein the data is transmitted by the terminal in a target transmission resource, based on a target transmission mode for a target number of n for times of repeated transmissions, wherein the target number of n for times of repeated transmissions is determined, by the terminal, in the set of transmission parameters based on the information field, and the target repeat transmission times n is one of the target candidate repeat transmission times, wherein the set of transmission parameters comprises at least one candidate number of repeated transmissions.

15. The method as claimed in claim 14, further comprising:
transmitting a first configuration signaling for configuring the set of transmission parameters to the terminal;
wherein the first configuration signaling comprises at least one of: a radio resource control (RRC) signaling, a media access control (MAC) control element (CE) signaling or a physical layer signaling.

16. The method as claimed in claim 14, wherein the set of transmission parameters is obtained based on a reference parameter and a set of factors.

17. The method as claimed in claim 16, further comprising:
transmitting a second configuration signaling for configuring the reference parameter to the terminal,
wherein the second configuration signaling comprises at least one of: a RRC signaling, a MAC CE signaling or a physical layer signaling.

18. The method as claimed in claim 16, further comprising:

transmitting a third configuration signaling for configuring the set of factors to the terminal, wherein the third configuration signaling comprises at least one of: a RRC signaling, a MAC CE signaling or a physical layer signaling.

19. A terminal device, comprising:

a processor; and a memory, wherein the memory is configured to store at least one instruction, at least one program, a set of codes and a set of instructions, and the at least one instruction, the at least one program, the set of codes and the set of instructions are loaded and executed by the processor to:

obtain a set of transmission parameters, wherein the set of transmission parameters comprises at least one candidate number of repeated transmissions;

receive downlink control information comprising an information field;

determine a target candidate number of repeated transmissions in the set of transmission parameters based on the information field as a target number of n for times of repeated transmissions, where n is a positive integer; and transmit data, in a target transmission resource, based on a target transmission mode for the target number n times.

20. A base station, comprising:

a processor; and a memory, wherein the memory is configured to store at least one instruction, at least one program, a set of codes and a set of instructions, and the at least one instruction, the at least one program, the set of codes and the set of instructions are loaded and executed by the processor to:

transmit downlink control information comprising an information field, wherein a terminal is configured to determine a target number of n for times of repeated transmissions based on a set of transmission parameters and the information field; and receive data from the terminal within a preset time and frequency, wherein the data is transmitted by the terminal in a target transmission resource, based on a target transmission mode for a target number of n for times of repeated transmissions, wherein the target number of n for times of repeated transmissions is determined, by the terminal, in the set of transmission parameters based on the information field, and the target repeat transmission times n is one of the target candidate repeat transmission times, wherein the set of transmission parameters comprises at least one candidate number of repeated transmissions.

* * * * *